United States Patent
Jang et al.

(10) Patent No.: US 9,631,413 B2
(45) Date of Patent: Apr. 25, 2017

(54) METHOD OF CONTROLLING POWER TRUNK OR POWER TAILGATE WITH SYNCHRONIZATION PROCEDURE BETWEEN LEFT AND RIGHT SPINDLES

(71) Applicant: MOTOTECH. CO. LTD, Gyeonggi-do (KR)

(72) Inventors: Se Yeong Jang, Gyeonggi-do (KR); Jae Young Park, Gyeonggi-do (KR); Sang Il Lee, Geyonggi-do (KR)

(73) Assignee: MOTOTECH, CO. LTD, Gyeonggi-Do (KR)

( * ) Notice: Subject to any disclaimer, the term of this patent is extended or adjusted under 35 U.S.C. 154(b) by 0 days.

(21) Appl. No.: 14/640,296

(22) Filed: Mar. 6, 2015

(65) Prior Publication Data
US 2016/0222713 A1  Aug. 4, 2016

(30) Foreign Application Priority Data
Mar. 7, 2014 (KR) .................. 10-2014-0027032

(51) Int. Cl.
| | |
|---|---|
| *H02P 1/00* | (2006.01) |
| *H02P 3/00* | (2006.01) |
| *H02P 5/00* | (2016.01) |
| *E05F 15/611* | (2015.01) |
| *E05F 15/622* | (2015.01) |
| *H02P 5/56* | (2016.01) |
| *B60J 5/10* | (2006.01) |

(52) U.S. Cl.
CPC ............ *E05F 15/611* (2015.01); *B60J 5/106* (2013.01); *E05F 15/622* (2015.01); *H02P 5/56* (2016.02); *E05Y 2400/41* (2013.01); *E05Y 2900/532* (2013.01); *E05Y 2900/546* (2013.01); *E05Y 2900/548* (2013.01)

(58) Field of Classification Search
CPC ......... E05Y 2900/546; E05Y 2400/326; E05Y 2600/46; E05Y 2900/548; E05Y 2201/434; E05Y 2201/214; E05Y 2201/24; E05Y 2201/416; E05Y 2201/604; E05Y 2201/618; E05Y 2201/706; E05Y 2600/13; E05Y 2800/00
USPC .............. 318/3, 400.12, 430, 280, 266, 286
See application file for complete search history.

(56) References Cited

U.S. PATENT DOCUMENTS

| | | | | |
|---|---|---|---|---|
| 5,729,101 | A | * 3/1998 | Richmond | ............ G05B 19/23 160/311 |
| 5,963,706 | A | * 10/1999 | Baik | ......................... H02P 6/28 318/400.31 |
| 5,982,126 | A | * 11/1999 | Hellinga | ...................... B60J 5/06 318/286 |

(Continued)

FOREIGN PATENT DOCUMENTS

| | | | |
|---|---|---|---|
| DE | 10 2008 057 014 A1 | | 5/2010 |
| GB | 1215965.3 | * | 9/2012 |

(Continued)

*Primary Examiner* — Paul Ip
(74) *Attorney, Agent, or Firm* — Hoffmann & Baron, LLP

(57) ABSTRACT

Disclosed is a method of effectively controlling a vehicle power trunk/tailgate in a vehicle power trunk/tailgate control system by performing a synchronization procedure between the left and right spindles in a vehicle having a power trunk/tailgate. Since a speed difference is not generated between the left and right spindle motors, the power trunk/tailgate can be driven more stably.

8 Claims, 4 Drawing Sheets

(56) References Cited

U.S. PATENT DOCUMENTS

| | | | | |
|---|---|---|---|---|
| 6,700,802 B2* | 3/2004 | Ulinski | .................... | H02J 3/32 307/66 |
| 6,719,356 B2* | 4/2004 | Cleland | ................ | E05F 1/1091 296/146.8 |
| 7,423,400 B2* | 9/2008 | Chinsen | ................ | E05F 15/611 318/280 |
| 7,586,280 B2* | 9/2009 | Warren | ................ | E05F 15/611 318/266 |
| 7,592,762 B2* | 9/2009 | Warren | ................ | E05F 15/611 318/266 |
| 7,764,036 B2* | 7/2010 | Hirai | ...................... | B60J 7/0573 318/280 |
| 8,103,416 B2* | 1/2012 | Frommer | ................ | E05F 15/77 701/49 |
| 2003/0030299 A1* | 2/2003 | Cleland | ................ | E05F 1/1091 296/146.8 |
| 2004/0124662 A1* | 7/2004 | Cleland | ................ | E05F 1/1091 296/146.4 |
| 2006/0181108 A1* | 8/2006 | Cleland | ................... | E05F 15/63 296/146.4 |
| 2007/0299588 A1* | 12/2007 | Warren | ................ | E05F 15/611 701/49 |
| 2008/0007191 A1* | 1/2008 | Chinsen | ................ | E05F 15/611 318/280 |
| 2008/0036410 A1* | 2/2008 | Hirai | ...................... | B60J 7/0573 318/468 |
| 2008/0061719 A1* | 3/2008 | Warren | ................ | E05F 15/611 318/14 |
| 2009/0222174 A1* | 9/2009 | Frommer | ................ | E05F 15/77 701/49 |
| 2010/0222955 A1* | 9/2010 | Chevalier | ........... | B60R 16/0231 701/31.4 |
| 2011/0185941 A1* | 8/2011 | Gonzalez Fernandez | ........... | B61D 19/026 105/341 |
| 2013/0024076 A1* | 1/2013 | Fukui | .................... | E05F 15/622 701/49 |
| 2015/0057895 A1* | 2/2015 | Yamada | ................ | E05F 15/659 701/49 |
| 2015/0224859 A1* | 8/2015 | Warburton | ............... | B60J 5/103 701/49 |
| 2015/0275562 A1* | 10/2015 | Warburton | ............... | B60J 5/103 701/49 |

FOREIGN PATENT DOCUMENTS

| | | | |
|---|---|---|---|
| GB | 1215966.1 | * | 9/2012 |
| GB | 1222259.2 | * | 12/2012 |
| JP | 2012-044001 | * | 2/2012 |

* cited by examiner

METHOD OF CONTROLLING POWER TRUNK OR POWER TAILGATE WITH SYNCHRONIZATION PROCEDURE BETWEEN LEFT AND RIGHT SPINDLES

CROSS REFERENCE TO RELATED APPLICATION AND CLAIM OF PRIORITY

The present invention contains subject matter related to Korean Patent Application No. 10-2014-0027032, filed in the Korean Patent Office on Mar. 7, 2014, the entire contents of which are incorporated herein by reference. Applicants also claim priority from Korean Application No. 10-2014-0027032 filed Mar. 7, 2014.

BACKGROUND OF THE INVENTION

Field of the Invention

The present invention relates to method of controlling a power trunk or tailgate, and more particularly, to a method of controlling a power trunk or tailgate with a synchronization procedure between left and right spindles.

Description of Related Art

In general, a trunk is used to store general luggage, an emergency tool kit, a spare tire, and the like. In some cases, a first-aid kit and the like are stored in the trunk for preparation against an accident. A lid that covers such a trunk room is called a trunk lid.

The trunk lid is locked/unlocked by a trunk locking device, which includes a hinge for allowing the trunk lid to be lifted by even a weak force as the locking device is released.

Recently, an automatic power trunk system capable of automatically opening or closing the trunk lid by making a simple switch operation on a driver seat has been developed.

In the related art, various techniques to control driving of the power trunk have been proposed.

By way of example of the related art, there is known a technique in which an angle of the trunk and a movement velocity is transmitted from a Hall sensor, the movement velocity of the trunk is classified into an accelerating cycle, a decelerating cycle, and a constant velocity cycle, and the velocity of the power trunk is controlled by increasing, decreasing, or maintaining a duty ratio at a constant rate for each cycle. In this technique, output power of a motor is controlled by increasing or decreasing the pulse width modulation (PWM) duty ratio at a constant rate so as to control the velocity of the trunk for each cycle.

When a vehicle having a power trunk or tailgate stops or is parked on a curved place or a sloping road, the center or gravity of the power trunk or tailgate is decentered, so that a difference is generated between loads applied to spindles of both sides of the power trunk or tailgate.

In this manner, when a difference is generated between the loads applied to the spindles of both sides, a difference is also generated between the speeds of both spindle motors. Therefore, a bending load is generated in the trunk or tailgate, and a deviation is disadvantageously generated in the trunk or tailgate.

CITATION LIST

Patent Literatures

[Patent Literature 1] Korean Patent Application Publication No. 10-2010-0059127

SUMMARY OF THE INVENTION

This invention has been made to address the aforementioned problems and provide a method of controlling a power trunk or tailgate with a synchronization procedure between left and right spindles in order to prevent a speed difference from being generated between spindle motors of both sides in a vehicle having the power trunk or tailgate.

The object of the present invention is not limited to those described above, and a person skilled in the art would apparently appreciate other objects by reading the following descriptions.

According to an aspect of the invention, there is provided a method of controlling a power trunk or a power tailgate in a power trunk or tailgate control system for controlling operations of the power trunk or the power tailgate in a vehicle having the power trunk or the power tailgate, the method comprising: checking whether the power trunk or the power tailgate has an open operation state or a close operation state; measuring a Hall effect count of a left spindle motor for driving a left spindle and a Hall effect count of a right spindle motor for driving a right spindle used to open or close the power trunk or the power trunk if the power trunk or the power tailgate has the open operation state or the close operation state; stopping operations of the left and right spindle motors and outputting an alarm if an error count is equal to or greater than a predetermined error limitation value as a result of the measurement of the Hall effect count of the left spindle motor and the Hall effect count of the right spindle motor; stopping operations of the left and right spindle motors and outputting an alarm if a difference of the Hall effect count obtained by comparing the Hall effect count of the left spindle motor and the Hall effect count of the right spindle motor is equal to or greater than a first predetermined limitation value; performing a synchronization procedure between the left and right spindles if the difference of the Hall effect count is smaller than the first limitation value and is equal to or greater than a second predetermined limitation value; and maintaining the current output ratio between the left and right spindle motors if the difference of the Hall effect count is smaller than the second limitation value.

The Hall effect count of the right spindle motor may be compared by referencing the Hall effect count of the left spindle motor.

In the aforementioned method, the performing the synchronization procedure may include increasing the output ratio of the right spindle motor if the power trunk or the power tailgate has the open operation state, and the Hall effect count of the right spindle motor is smaller than the Hall effect count of the left spindle motor, and decreasing the output ratio of the right spindle motor if the Hall effect count of the right spindle motor is greater than the Hall effect count of the left spindle motor. Furthermore, the performing the synchronization procedure may include decreasing the output ratio of the right spindle motor if the power trunk or the power tailgate has the close operation state, and the Hall effect count of the right spindle motor is smaller than the Hall effect count of the left spindle motor, and increasing the output ratio of the right spindle motor if the Hall effect count of the right spindle motor is greater than the Hall effect count of the left spindle motor.

In the increasing the output ratio of the right spindle motor, the output ratio of the right spindle motor may increase without exceeding the second limitation value.

In the decreasing the output ratio of the right spindle motor, the output ratio of the right spindle motor may decrease without exceeding the second limitation value.

The method may further comprise initializing a synchronization value when the close operation of the power trunk or the power tailgate is normally completed.

According to this invention, since the synchronization procedure is performed between the left and right spindles in a vehicle having a power trunk or a power tailgate, a speed difference is not generated between both the spindle motors. Therefore, it is possible to drive the power trunk or the power tailgate more stably.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION OF THE INVENTION

Figure 1:
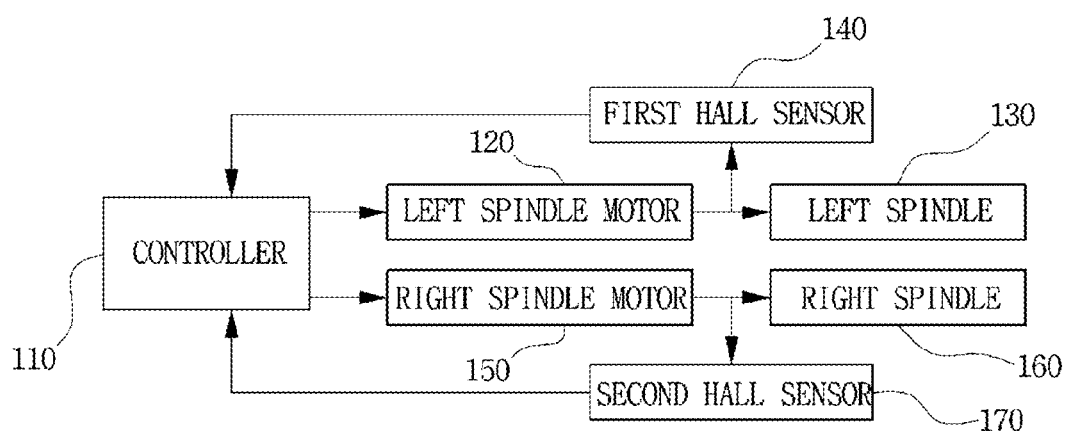
FIG. 1 is a block diagram illustrating a configuration of a power trunk or tailgate control system according to an embodiment of the invention.

Since the present invention may be modified or embodied in various forms, particular embodiments will be described in detail with reference to the accompanying drawings. However, it should be noted that they are not intended to limit the invention, but include all possible all possible modifications, equivalents, and substitutes within the scope and spirit of the present invention.

The terminology used herein is only for the purpose of describing particular embodiments and is not intended to limit the invention. As used herein, the singular forms "a", "an" and "the" may be intended to include the plural forms as well, unless the context clearly indicates otherwise. It is further to be noted that, as used herein, the terms "comprises", "comprising", "include", and "including" indicate the presence of stated features, integers, steps, operations, units, and/or components, but do not preclude the presence or addition of one or more other features, integers, steps, operations, units, and/or components, and/or combination thereof.

Unless specified otherwise, all terminologies used herein, including technical and scientific terminologies, have the same meaning as those understood generally by a person skilled in art. Terminologies defined in a general dictionary are to be construed as the same meanings as those understood in the context of the related art. Unless specified clearly herein, they are not construed as ideal or excessively formal meanings.

It is noted that like reference numerals denote like elements throughout overall drawings. In addition, descriptions of well-known apparatus and methods may be omitted so as to not obscure the description of the representative embodiments, and such methods and apparatus are clearly within the scope and spirit of the present disclosure.

The present invention provides a power trunk or tailgate control system for controlling driving operations of a power trunk or tailgate in a vehicle having the power trunk or tailgate.

FIG. 1 is a block diagram illustrating a configuration of the power trunk or tailgate control system according to an embodiment of the invention.

Referring to FIG. 1, the power trunk or tailgate control system according to the present invention comprises a controller 110, a left spindle motor 120, a left spindle 130, a first Hall sensor 140, a right spindle motor 150, a right spindle 160, and a second Hall sensor 170.

The left and right spindles 130 and 160 are positioned in the left and right sides of the power trunk or tailgate to drive the power trunk or tailgate.

The left spindle motor 120 drives the left spindle 130 under control of the controller 110.

The right spindle motor 150 drives the right spindle 160 under control of the controller 110.

The first Hall sensor 140 detects a speed of the left spindle motor 120 to generate a Hall effect count.

The second Hall sensor 140 detects a speed of the right spindle motor 150 to generate a Hall effect count.

The controller 110 receives the Hall effect counts from the first and second Hall sensors 140 and 170 and controls an output ratio between the left and right spindle motors 120 and 150 based on the Hall effect counts.

Now, a description will be made in detail for a method of controlling the power trunk or tailgate by controlling the output ratio of the left or right spindle motor 120 or 150 using the controller 110.

Figure 2:
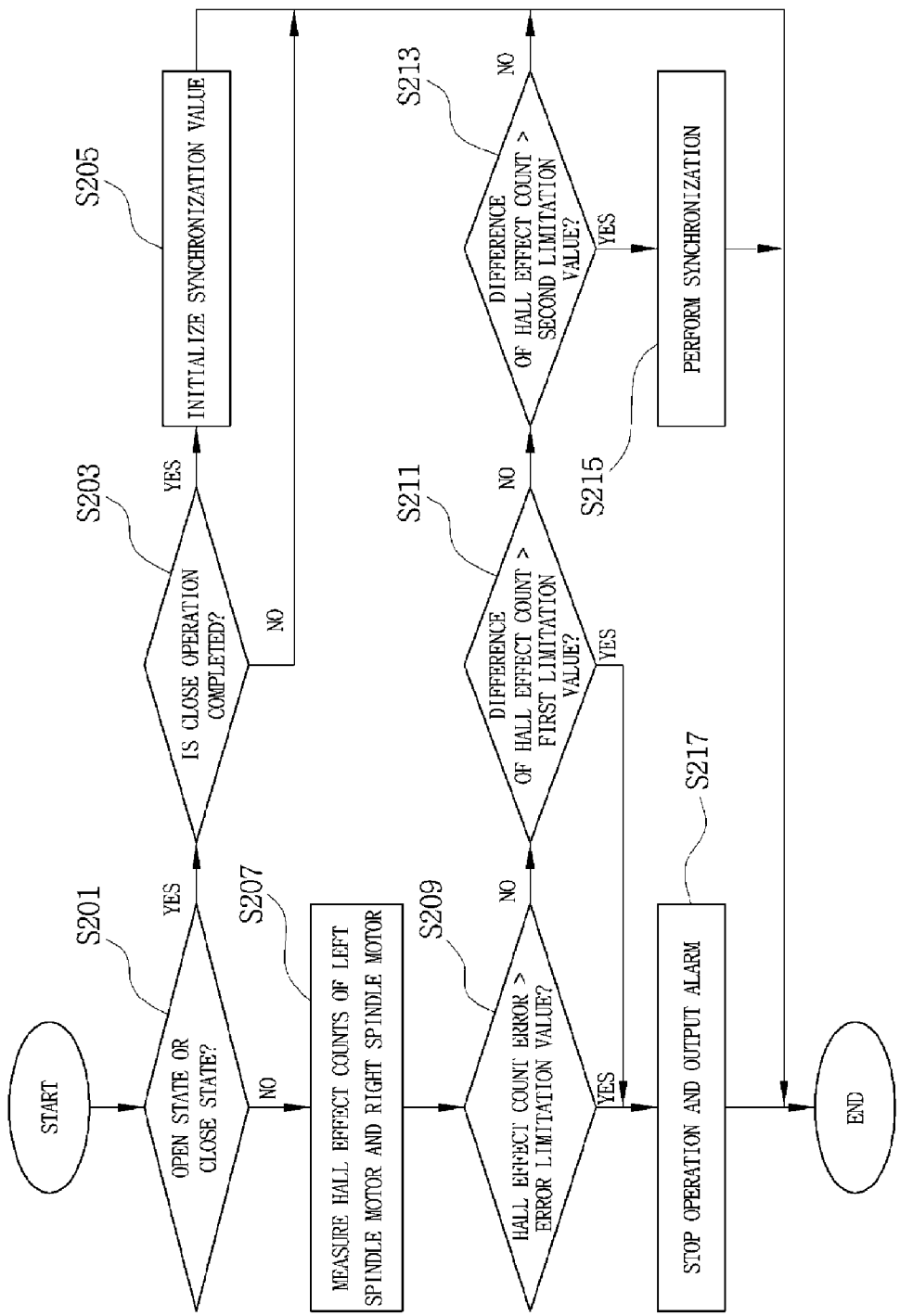
FIGS. 2 and 3 are flow charts illustrating a method of controlling a power trunk or tailgate according to an embodiment of the invention.
Figure 3:
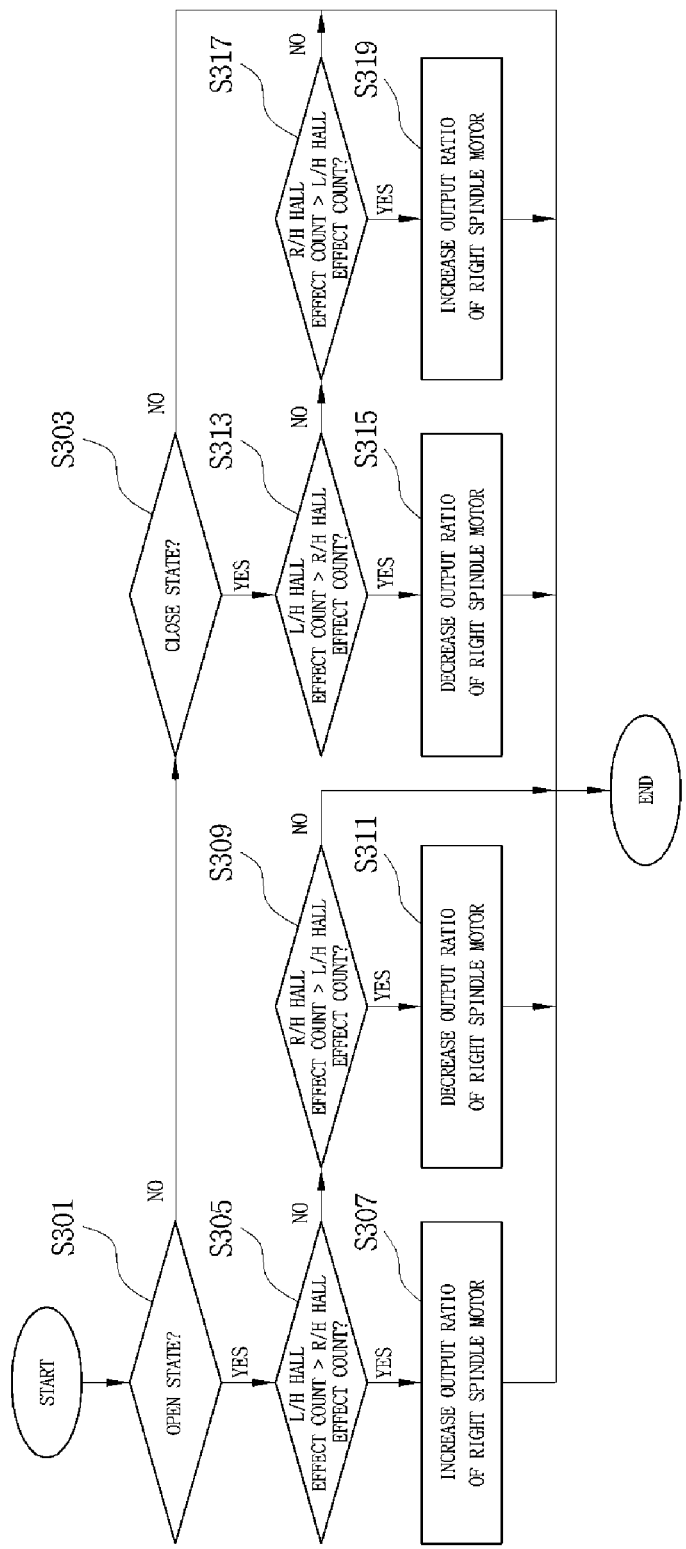

FIGS. 2 and 3 are flow charts illustrating a method of controlling the power trunk or tailgate according to an embodiment of the invention.

Specifically, FIGS. 2 and 3 are flow charts illustrating a method of controlling a power trunk or tailgate in a power trunk or tailgate control system for controlling operations of the power trunk or tailgate in a vehicle having a power trunk or a power tailgate.

Referring to FIG. 2, the power trunk or tailgate control system checks whether the power trunk or tailgate has an open operation state or a close operation state in step S201.

If the power trunk or tailgate has the open operation state or the close operation state, the power trunk or tailgate control system measures a Hall effect count of the left spindle motor 120 for driving the left spindle 130 and the Hall effect count of the right spindle motor 150 for driving the right spindle 160 used to open or close the power trunk or tailgate in step S207.

If an error count is equal to or greater than a predetermined error limitation in step S209 as a result of the measurement of the Hall effect counts of the left and right spindle motors 120 and 150, the driving of the left and right spindle motors 120 and 150 stops, and an alarm is output in step S217.

The Hall effect count of the left spindle motor 120 and the Hall effect count of the right spindle motor 150 are compared. If a difference of the Hall effect count between the left and right spindle motors 120 and 150 is equal to or greater than a first predetermined limitation value in step S211, the driving of the left and right spindle motors 120 and 150 stops, and an alarm is output in step S217.

If the difference of the Hall effect count is smaller than the first limitation value and is equal to or greater than a second predetermined limitation value in steps S211 and S213, a synchronization procedure is performed between the left and right spindles 130 and 160 in step S215.

If the difference of the Hall effect count is smaller than the second limitation value, the current output ratio between the left and right spindle motors 120 and 150 is maintained.

If the close operation of the power trunk or tailgate in step S201 is normally completed in step S203, the synchronization value is initialized in step S205.

Now, a description will be made in detail for a synchronization procedure between the left and right spindles 130 and 160 according to the present invention.

FIG. 3 is a flow chart illustrating a synchronization procedure between the left and right spindles according to an embodiment of the invention.

In FIG. 3, it is assumed that the Hall effect count of the right spindle motor 150 is compared by referencing the Hall effect count of the left spindle motor 120, and the controller 110 performs the synchronization procedure by increasing or decreasing the output ratio of the right spindle motor 150.

Referring to FIG. 3, if the power trunk or tailgate has an open operation state in step S301, and the Hall effect count of the right spindle motor 150 is smaller than the Hall effect count of the left spindle motor 120 in step S305, the output ratio of the right spindle motor 150 increases in step S307.

If the Hall effect count of the right spindle motor 150 is greater than the Hall effect count of the left spindle motor 120 in step S309, the output ratio of the right spindle motor 150 decreases in step S311.

In comparison, if the power trunk or tailgate has a close operation state in step S303, and the Hall effect count of the right spindle motor 150 is smaller than the Hall effect count of the left spindle motor 120 in step S313, the output ratio of the right spindle motor 120 decreases in step S315.

If the Hall effect count of the right spindle motor 150 is greater than the Hall effect count of the left spindle motor 120 in step S317, the output ratio of the right spindle motor 150 increases in step S319.

In the course of increasing the output ratio of the right spindle motor 150 in steps S307 and 319, the output ratio of the right spindle motor 150 preferably increases without exceeding the second limitation value.

In the course of decreasing the output ratio of the right spindle motor 150 in steps S311 and S315, the output ratio of the right spindle motor 150 preferably decreases without exceeding the second limitation value.

Figure 4:
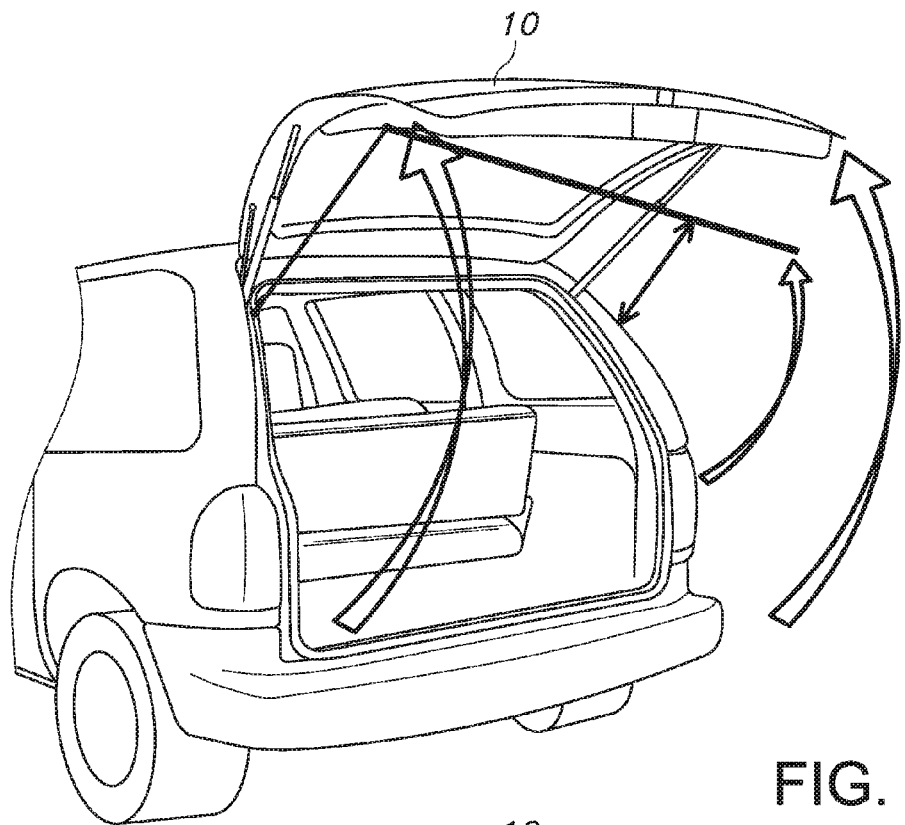
FIG. 4 is a diagram for describing operations performed when the power tailgate is opened according to an embodiment of the invention.

FIG. 4 is a diagram illustrating operations when the power tailgate is opened according to an embodiment of the invention.

Referring to FIG. 4, the output ratio of the right spindle motor 150 increases if the Hall effect count of the right spindle motor 150 is smaller than the Hall effect count of the left spindle motor 120 when the open operation of the power tailgate 10 is performed.

Figure 5:
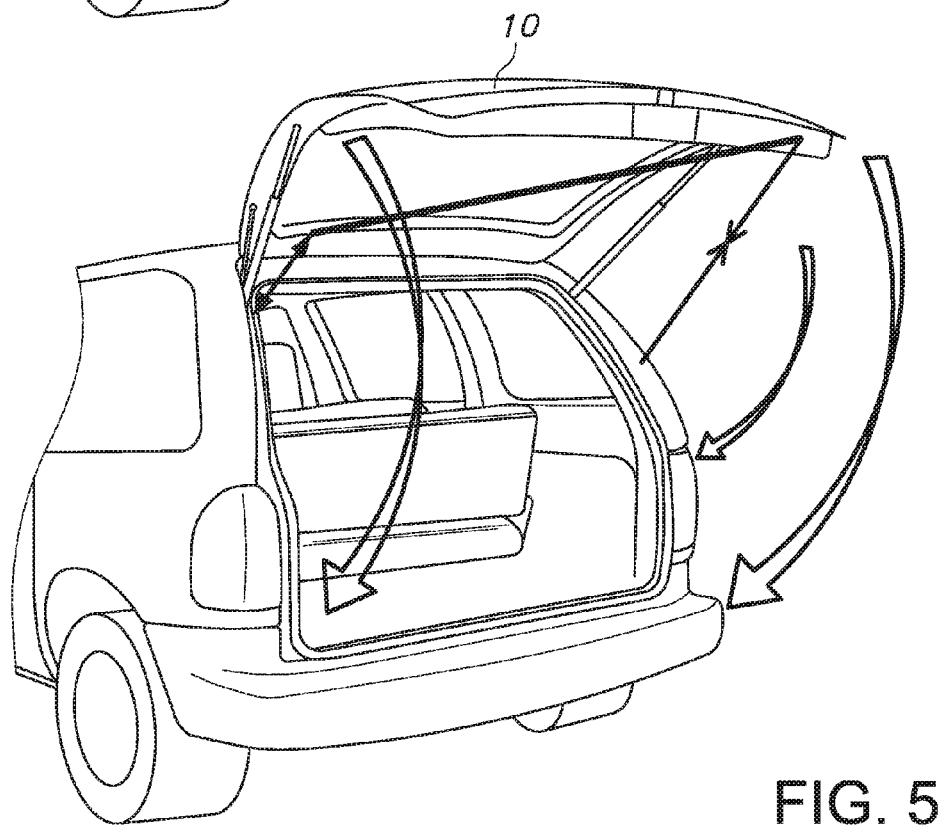
FIG. 5 is a diagram for describing operations performed when the power tailgate is closed according to an embodiment of the invention.

FIG. 5 is a diagram illustrating operations when the power tailgate is closed according to an embodiment of the invention.

Referring to FIG. 5, the output ratio of the right spindle motor 150 increases if the Hall effect count of the right spindle motor 150 is greater than the Hall effect count of the left spindle motor 120 when the close operation of the power tailgate 10 is performed.

Although exemplary embodiments of the present invention have been shown and described hereinbefore, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

What is claimed is:

1. A method of controlling a power trunk or a power tailgate in a power trunk or tailgate control system for controlling operations of the power trunk or the power tailgate in a vehicle having the power trunk or the power tailgate, the method comprising:

checking whether the power trunk or the power tailgate has an open operation state or a close operation state;

measuring, using a first Hall sensor, a Hall effect count of a left spindle motor for driving a left spindle and, measuring using a second Hall sensor, a Hall effect count of a right spindle motor for driving a right spindle used to open or close the power trunk or the power tailgate if the power trunk or the power tailgate has the open operation state or the close operation state;

stopping, using a controller, operations of the left and right spindle motors and outputting an alarm if an error count is equal to or greater than a predetermined error limitation value as a result of the measurement of the Hall effect count of the left spindle motor and the Hall effect count of the right spindle motor, wherein the controller is operably connected to the first and second Hall sensors and the first and second spindle motors, the controller receiving Hall effect counts from the first and second Hall sensors;

stopping, using the controller, operations of the left and right spindle motors and outputting an alarm if a difference of the Hall effect count obtained by comparing the Hall effect count of the left spindle motor and the Hall effect count of the right spindle motor is equal to or greater than a first predetermined limitation value;

performing, using the controller, a synchronization procedure between the left and right spindles if the difference of the Hall effect count is smaller than the first limitation value and is equal to or greater than a second predetermined limitation value, the synchronization procedure changing an output ratio of at least one of the first and second spindle motors; and maintaining, using the controller, a current output ratio between the left and right spindle motors if the difference of the Hall effect count is smaller than the second limitation value.

2. The method according to claim 1, wherein the Hall effect count of the right spindle motor is compared by referencing the Hall effect count of the left spindle motor.

3. The method according to claim 2, wherein the performing the synchronization procedure includes increasing the output ratio of the right spindle motor if the power trunk or the power tailgate has the open operation state, and the Hall effect count of the right spindle motor is smaller than the Hall effect count of the left spindle motor, and decreasing the output ratio of the right spindle motor if the Hall effect count of the right spindle motor is greater than the Hall effect count of the left spindle motor.

4. The method according to claim 3, wherein the performing the synchronization procedure includes decreasing the output ratio of the right spindle motor if the power trunk or the power tailgate has the close operation state, and the Hall effect count of the right spindle motor is smaller than the Hall effect count of the left spindle motor, and increasing the output ratio of the right spindle motor if the Hall effect count of the right spindle motor is greater than the Hall effect count of the left spindle motor.

5. The method according to claim 4, wherein, in the increasing the output ratio of the right spindle motor, the output ratio of the right spindle motor increases without exceeding the second limitation value.

6. The method according to claim 4, wherein, in the decreasing the output ratio of the right spindle motor, the output ratio of the right spindle motor decreases without exceeding the second limitation value.

7. The method according to claim 1, further comprising initializing a synchronization value when the close operation of the power trunk or the power tailgate is normally completed.

8. A power trunk or a power tailgate control system comprising:
- a first and second spindle adapted to be positioned on opposing sides of a power trunk or a power tailgate;
- a first motor operably connected to the first spindle and a second motor operably connected to the second spindle;
- a first Hall sensor operably connected to the first motor and a second Hall sensor operably connected to the second motor, the first Hall sensor providing a Hall effect count responsive to the operation of the first motor and the second Hall sensor providing a Hall effect count responsive to the operation of the second motor; and
- a controller operably connected to the first and second spindle motors and to the first and second Hall sensors,
- the first Hall sensor measuring a Hall effect count of the first spindle motor for driving the first spindle and the second Hall sensor measuring a Hall effect count of the second spindle motor for driving the second spindle used to open or close the power trunk or the power tailgate if the power trunk or the power tailgate has an open operation state or a close operation state,
- the controller stopping operations of the first and second spindle motors and outputting an alarm if an error count is equal to or greater than a predetermined error limitation value as a result of the measurement of the Hall effect count of the first spindle motor and the Hall effect count of the second spindle motor,
- the controller stopping operations of the first and second spindle motors and outputting an alarm if a difference of the Hall effect count obtained by comparing the Hall effect count of the first spindle motor and the Hall effect count of the second spindle motor is equal to or greater than a first predetermined limitation value,
- the controller performing a synchronization procedure between the first and second spindles if the difference of the Hall effect count is smaller than the first limitation value and is equal to or greater than a second predetermined limitation value, the synchronization procedure changing an output ratio of at least one of the first and second motors, and
- the controller maintaining a current output ratio between the first and second spindle motors if the difference of the Hall effect count is smaller than the second limitation value.

* * * * *